(No Model.)
R. F. DERRICK.
VARIABLE NOZZLE.
No. 351,968. Patented Nov. 2, 1886.
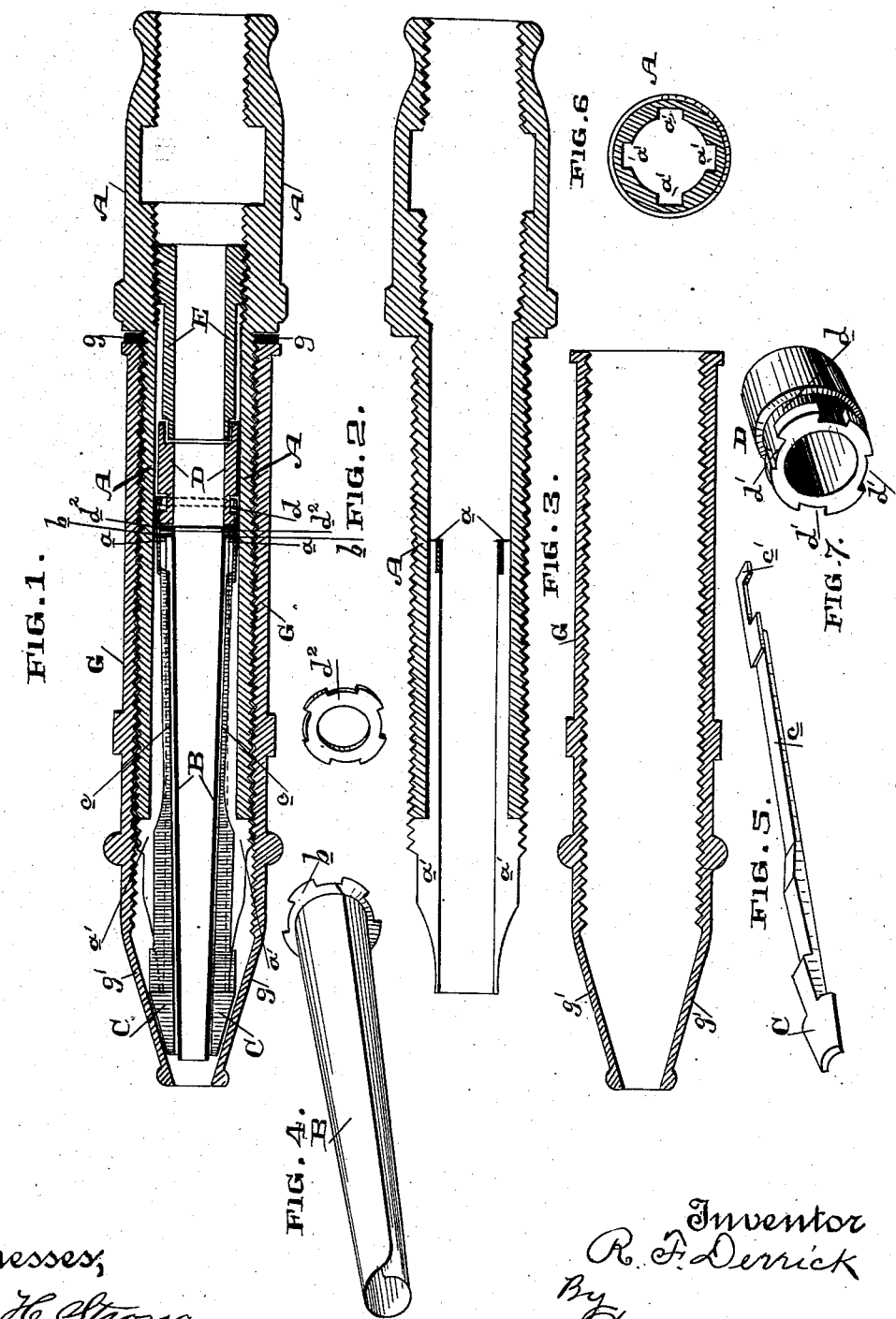

UNITED STATES PATENT OFFICE.

RODOLPHUS FREDERICK DERRICK, OF OROVILLE, CALIFORNIA, ASSIGNOR OF ONE-THIRD TO MILTON J. GREEN, OF SAME PLACE.

VARIABLE NOZZLE.

SPECIFICATION forming part of Letters Patent No. 351,968, dated November 2, 1886.

Application filed August 14, 1886. Serial No. 210,956. (No model.)

*To all whom it may concern:*

Be it known that I, RODOLPHUS FREDERICK DERRICK, of Oroville, county of Butte, and State of California, have invented an Improvement in Variable Nozzles; and I hereby declare the following to be a full, clear, and exact description thereof.

My invention relates to that class of nozzles or hose-pipes which are adapted to be reduced or expanded in diameter, and which are therefore known as "reducing" or "variable" nozzles.

My invention consists in a novel expansible tube, segmental jaws embracing said tube, and an adjustable or movable conical seat embracing the jaws, whereby they are forced upon the tube to decrease its diameter, and relieved therefrom to allow it to expand again.

My invention further consists in the details of construction of the nozzle, which I shall hereinafter fully describe.

The object of my invention is to provide a simple and effective nozzle, which is adapted to have its diameter readily increased or decreased.

Referring to the accompanying drawings, Figure 1 is a longitudinal section of my variable nozzle. Fig. 2 is a section of the pipe A. Fig. 3 is a section of exterior pipe, G. Fig. 4 is a perspective view of expansible tube B. Fig. 5 is a view of one of the jaws C. Fig. 6 is a cross-section of pipe A. Fig. 7 is a perspective view of clutch-ring D.

A is a pipe in which is seated an expansible tube, B, made of springy sheet metal curved and having its loose edges overlapping, so that said tube will yield to external pressure whereby its diameter may be reduced and will expand again of its own springy nature when relieved of the pressure. This expansible tube B is fixed within the pipe A by means of a flange, $b$, on its inner end, engaging an internal collar or flange, $a$, in the pipe A, and said tube B is held in such relation to the pipe A that its forward end projects therefrom.

C are the segmental jaws, by which the pressure is applied to the expansible tube. The inner faces of the jaws are curved to conform to the periphery of the tube B, and their outer faces are also curved, and are beveled to form arcs or curves of a truncated cone. The shanks or stems $c$ of the jaws pass backwardly through slots $a'$, made in the forward end of the pipe A, and are seated in grooves in the inner surface of said pipe, their inner ends passing by the internal flange, $a$, of the pipe, which is slotted or grooved for their passage, and are formed with hooks $c'$, as shown. The jaws are held in their seats in the pipe by means of a clutch-ring, D, which is fitted within the pipe, and has a circumferential groove, $d$, around its inner end with short axial grooves $d'$, whereby it is enabled to fit over the ends of the shanks or stems of the jaws and receive their hooks in the circumferential groove. A washer, $d^2$, is preferably placed between the clutch-ring and the head of the expansible tube B. The clutch ring is held to its seat by means of a gland-nut, E, which screws into the pipe A and fits its inner end into or against the adjacent end of the clutch-ring, whereby it is set up firmly in its place.

The jaws C are operated by means of the exterior pipe, G, which is internally threaded and screws upon the externally threaded surface of the pipe A back to a packing-seat, $g$. The forward end $g'$ of the pipe G is made conical or tapering, and encircles the jaws C, forming a seat therefor.

The operation of my nozzle is as follows: By screwing the exterior pipe, G, back as far as it will go the jaws C are forced by the conical end of said pipe to press closely upon and around the expansible tube B, and thus to reduce said tube in diameter to its smallest limit. Now, by unscrewing the pipe G the pressure of its conical point is relieved from the jaws, which thereby relieves the expansible tube B, whereby it increases its diameter as the pipe G is unscrewed. This operation may be had while the stream is passing through the nozzle, and there is therefore no loss of time in having to stop the flow of water while the nozzle is manipulated.

I am aware that it is not new in nozzles of this class to force sectional tubes to smaller diameters, and I do not, therefore, claim such broadly.

Having thus described my invention, what I claim as new, and desire to secure by Letters Patent, is—

1. In a variable nozzle, the expansible tube B, of springy sheet metal curved, having its loose edges overlapping and provided with the collar $b$, in combination with the segmental jaws C, encircling said tube and increasing or decreasing its diameter, when pressure is withdrawn or applied, the hooks $c'$ on said jaws, and the clutch-ring D, engaging said hooks, substantially as herein described.

2. In a variable nozzle, the expansible tube formed of a piece of curved springy sheet metal having its meeting edges overlapping, in combination with an exterior pipe, the segmental jaws C, and a pipe, A, having slots $a'$ in its forward end, within which the jaws are seated, whereby they may be pressed upon the tube, substantially as herein described.

3. In a variable nozzle, the pipe A, having the slots $a'$ and the expansible tube, in combination with the segmental jaws C, seated in said slots and embracing the tube, and the exterior pipe, G, screwed upon the pipe A, and having a conical point, whereby said jaws are pressed upon the tube, substantially as herein described.

4. In a variable nozzle, the pipe A, having an internal grooved or notched flange or collar, $a$, and the expansible tube B, consisting of springy sheet metal, the loose edges or ends of which overlap, said tube having a flange, $b$, at its inner end engaging the flange or collar of the pipe A, in combination with the segmental jaws C, having shanks $c$ seated in the pipe A, and with hooks $c'$ on their ends, the grooved clutch-ring D, engaging said hooks, the gland-nut E, holding the clutch-ring to its place, and the exterior pipe, G, screwed upon the pipe A, and having a conical point, $g'$, in which the segmental jaws C are seated, all arranged and adapted to operate substantially as described.

In witness whereof I have hereunto set my hand.

RODOLPHUS FREDERICK DERRICK.

Witnesses:
E. O. ROLLINS,
G. M SPARKS.